United States Patent [19]
Hickman

[11] Patent Number: 5,936,851
[45] Date of Patent: Aug. 10, 1999

[54] REGULATED RESONANT CONVERTER

[75] Inventor: Kevin Hickman, Witney, United Kingdom

[73] Assignee: Oxford Magnet Technology Limited, Eynsham, United Kingdom

[21] Appl. No.: 08/815,187

[22] Filed: Mar. 11, 1997

[30] Foreign Application Priority Data

Mar. 23, 1996 [GB] United Kingdom .................. 9606192

[51] Int. Cl.$^6$ ........................... H02M 3/335; H02M 3/24
[52] U.S. Cl. .................... 363/17; 363/98; 363/37
[58] Field of Search ................... 363/17, 16, 98, 363/97, 132, 124; 323/254; 315/209 R

[56] References Cited

U.S. PATENT DOCUMENTS

| | | | |
|---|---|---|---|
| 5,057,698 | 10/1991 | Widener et al. .................. | 363/17 |
| 5,111,133 | 5/1992 | Poulo et al. .................. | 323/286 |
| 5,267,138 | 11/1993 | Shore .................. | 363/95 |
| 5,448,466 | 9/1995 | Erckert . | |
| 5,625,538 | 4/1997 | Lee et al. .................. | 363/15 |

Primary Examiner—Peter S. Wong
Assistant Examiner—Rajnikant B. Patel
Attorney, Agent, or Firm—Evenson, McKeown, Edwards & Lenahan, PLLC

[57] ABSTRACT

A regulated resonant converter comprises a series resonant circuit through which current is switched alternately in opposite directions by a pair of switching transistors, a rectifier via which the switching transistors are fed with d.c. current from an a.c. mains supply input, operation of the switching transistors being controlled by signals generated in a control circuit, in dependence upon a fed-back sample of a convertor output developed in the resonant circuit in accordance with the amplitude of which regulation is effected, and a cross-over voltage associated with current reversal in an inductor which forms a part of the resonant circuit, which cross-over voltage is fed to the control circuit via a differentiator whereby switch operation is effectively enhanced.

8 Claims, 5 Drawing Sheets

REGULATED RESONANT CONVERTER

This invention relates to regulated resonant converters.

Regulated resonant converters are well known and may be used to convert an a.c. mains supply to a regulated source of electrical energy. Regulated resonant converters are widely used for various applications, but this invention is especially, although not exclusively concerned with their use in magnetic resonant imaging (MRI) systems, for providing controlled electrical energy to gradient coils for the purpose of modifying the magnetic field of an MRI magnet as required for imaging. Known regulated resonant converters comprise a series resonant circuit through which current is switched alternately in opposite directions at a frequency which corresponds to, or which is close to the resonant frequency of the series resonant circuit, by a pair of switching transistors fed via a rectifier from an a.c. mains supply. Operation of the switching transistors is controlled by signals generated in a control circuit in dependence upon a fed-back sample of an output voltage from the converter which is developed in the resonant circuit, and a cross-over voltage derived in dependence upon current reversal in an inductor, which forms a part of the resonant circuit, regulation being effected in dependence upon modification of the fed-back sample.

With known regulated resonant converter arrangements, efficiency of operation tends to be somewhat degraded due to losses in the switching transistors.

It is an important object of the present invention to provide a regulated resonant converter wherein switching losses are minimised or, at least, reduced.

According to the present invention, a regulated resonant converter comprises a series resonant circuit through which current is switched alternately in opposite directions by a pair of switching transistors, a rectifier via which the switching transistors are fed with d.c. current from an a.c. mains supply input, operation of the switching transistors being controlled by signals generated in a control circuit, in dependence upon a fed-back sample of a convertor output developed in the resonant circuit in accordance with the amplitude of which regulation is effected, and a cross-over voltage associated with current reversal in an inductor which forms a part of the resonant circuit, which cross-over voltage is fed to the control circuit via a differentiator whereby switch operation is effectively enhanced.

The converter output may be a converter output voltage which is developed in the resonant circuit.

Alternatively, the converter output may be derived from a current supplied by the converter.

The switching transistors may be coupled to the control circuit via optocouplers through which signals are transmitted from the control circuit to effect operation of the switching transistors.

The cross-over voltage may be generated in a coupling transducer which is responsive to current in the resonant circuit and which is coupled to the control circuit via the differentiator.

The feedback voltage may be sensed across a capacitor which forms a part of the resonant circuit and which is fed via an isolating transformer and a rectifier to the control circuit.

The feedback voltage may be applied to an operational amplifier in the control circuit, together with a reference voltage, the amplitude of which is arranged to be controllable for the purpose of controlling the converter output voltage correspondingly, the operational amplifier being arranged to feed logic circuit means responsive also to the differentiated cross-over voltage, in accordance with the operation of which logic circuit means, switching signals for the switching transistors are generated.

The regulated resonant converter may form a part of the power supply for the gradient coils of an MRI system.

The power supply may comprise three similar transformers, the primary windings of which are fed in parallel from the regulated resonant converter, each transformer having a pair of secondary windings so that three pairs of secondary windings are provided, one for each of the three gradient coils of an MRI system, each pair being arranged to feed a gradient coil with which it is operatively associated, via rectifier and amplifier means.

One embodiment of invention will now be described by way of example only, with reference to the accompanying drawings in which.

Figure 1:
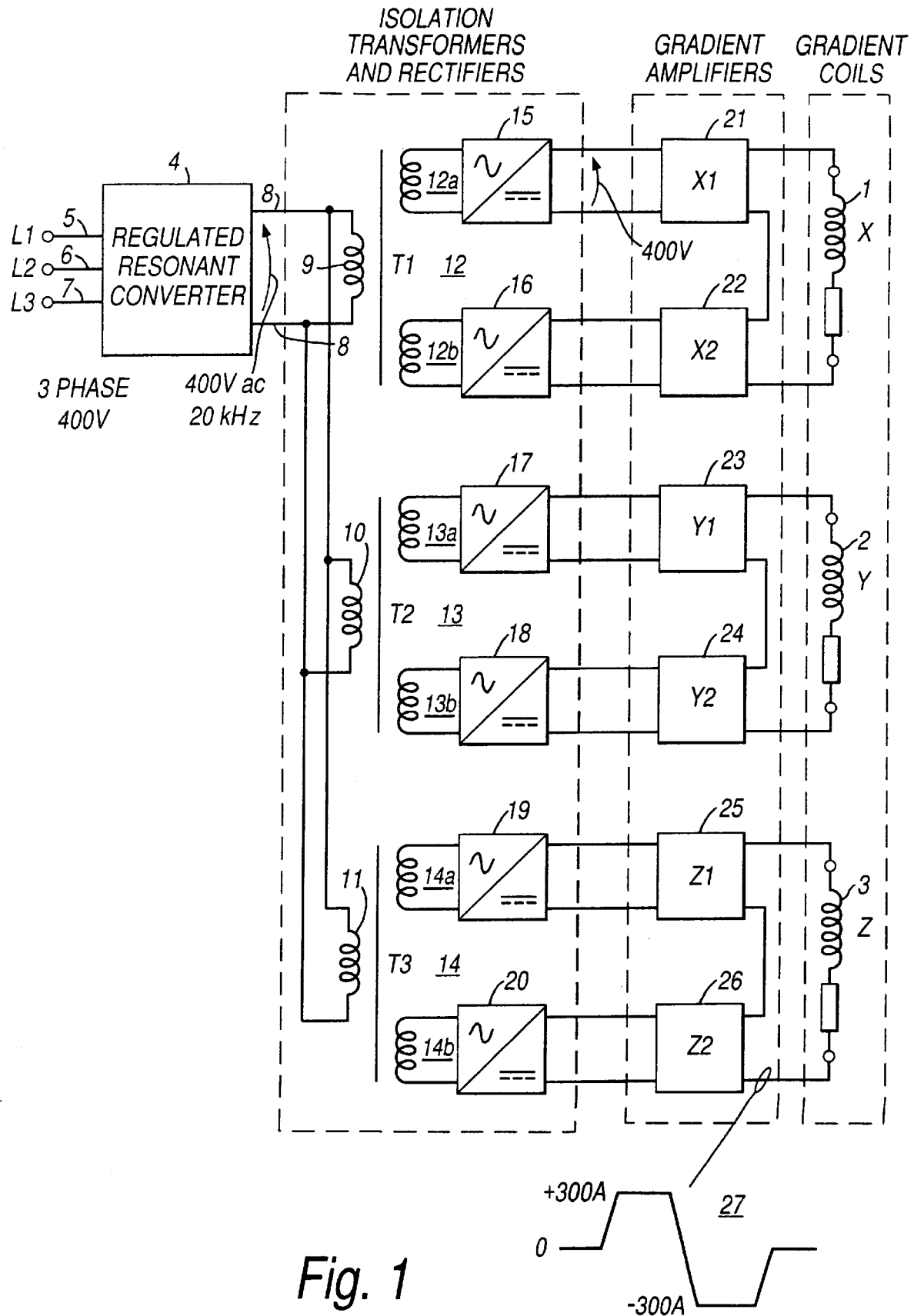
FIG. 1 is a somewhat schematic block/circuit diagram of an arrangement for energising the gradient coils of an MRI system.

Referring now to FIG. 1, a circuit arrangement for energising gradient coils 1, 2 and 3 of an MRI system comprises a regulated resonant converter 4 which is fed from terminals 5, 6 and 7 of a three-phase, 400 V 50 c/s a.c. supply. The regulated resonant converter 4 provides on output lines 8 a single phase 400 V a.c. supply at a frequency of nominally 20 kHz. This 400 V a.c. 20 kHz supply is fed to primary windings 9, 10 and 11 of transformers 12, 13 and 14 respectively, which serve for isolation purposes. Secondary windings 12a, 12b and 13a, 13b and 14a, 14b of the transformers 12, 13 and 14 respectively are arranged to feed rectifiers 15, 16, 17, 18, 19 and 20 as shown, to produce a 400 V d.c. supply for gradient amplifiers 21, 22, 23, 24, 25 and 26 respectively. In order to provide the required rate of change of current in the gradient coils 1, 2 and 3, the gradient amplifiers are connected in pairs so that gradient amplifiers 21 and 22 feed the gradient coil 1, gradient amplifiers 23 and 24 feed the gradient coil 2 and gradient amplifiers 25 and 26 feed the gradient coil 3. In operation, the gradient amplifiers 21 to 26 are switched to produce a waveform in 27 (as shown inset in FIG. 2) in each of the gradient coils 1, 2 and 3, so as to produce appropriate modification of the magnetic field produced by the magnet of an MRI system as required for imaging. The principles of operation of the magnet, the MRI system and the imaging system are well known to those skilled in the art, and are not central to the present invention. Accordingly, they will not be described in detail herein.

Figure 2:
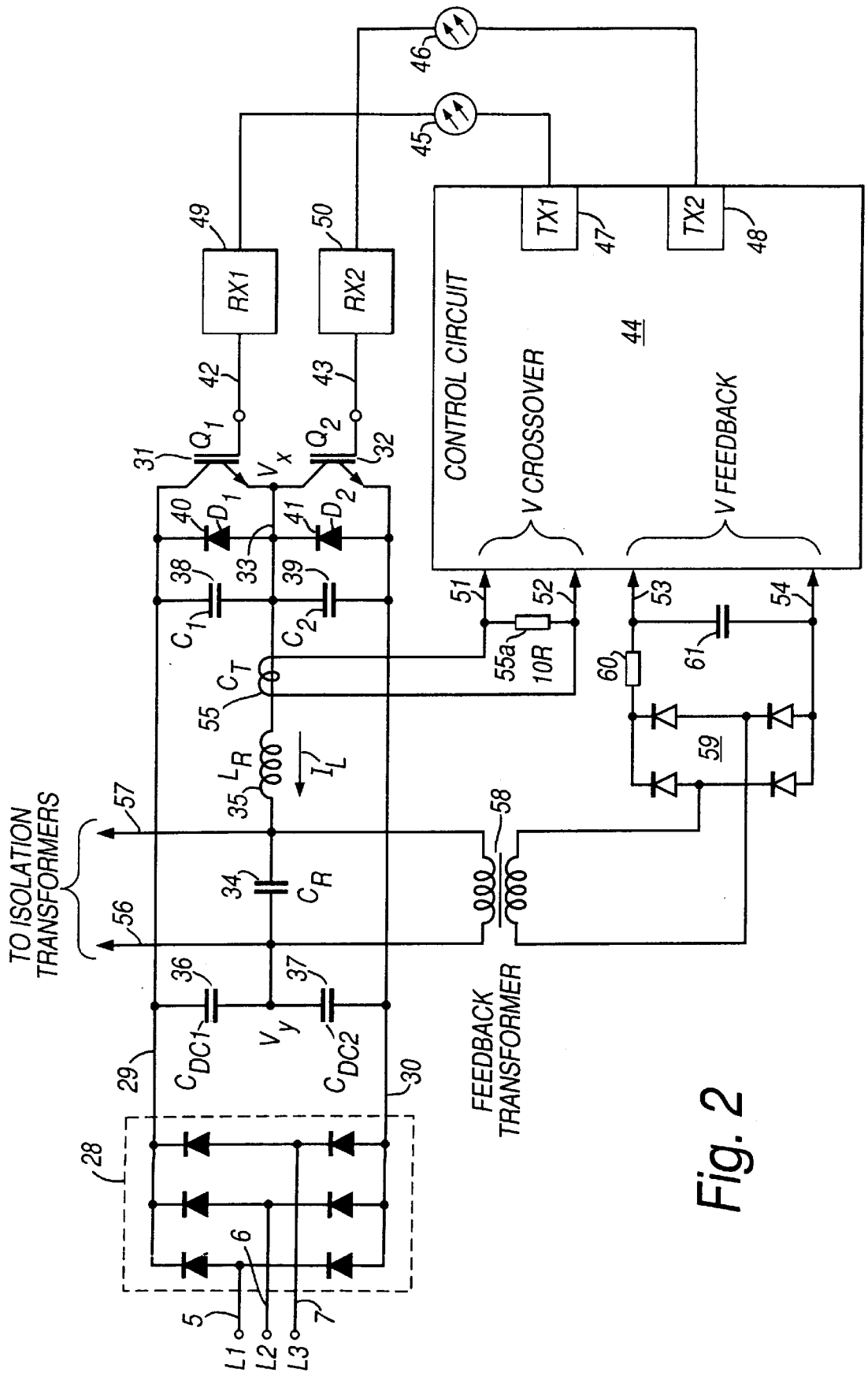
FIG. 2 is a generally schematic block/circuit diagram of a regulated resonant converter for use in the arrangement shown in FIG. 1.

Referring now to FIG. 2, wherein the regulated resonant converter 4 is shown in greater detail, the three-phase input lines 5, 6 and 7 are arranged to feed a rectifier as shown within broken line 28 thereby to provide between lines 29 and 30 a d.c. voltage which is applied to a pair of serially connected switching transistors 31 and 32. A junction 33 between the switching transistors 31 and 32 is coupled via a series resonant circuit comprising a capacitor 34 and an inductor 35 to a junction between two capacitors 36 and 37 which are serially connected between the d.c. supply lines 29 and 30. The transistors 31 and 32 are shunted by snubber capacitors 38 and 39 which are serially connected and coupled at a junction therebetween to the junction 33 between the transistors 31 and 32. The capacitors 38 and 39 are arranged to be shunted by diodes 40 and 41 respectively.

The transistors 31 and 32 in operation are switched by signals applied to their respective gate terminals via lines 42 and 43 respectively. The signals for switching the transistors 31 and 32 are derived in a control circuit 44 which is coupled via optical links 45 and 46 (shown schematically) to the transistors 31 and 32. Optical signals are generated within the control circuit 44 in transmitters 47 and 48 and converted to corresponding electrical signals in receivers 49 and 50 which feed the transistors 31 and 32 respectively. Switching is effected by the control circuit 44 in dependence upon a cross-over voltage applied to the control circuit 44 via lines 51 and 52, and a feedback voltage which is fed to the control circuit 44 via lines 53 and 54.

The cross-over voltage is derived via a coupling transducer 55 from the line 33 and the feedback voltage comprises, in effect, a sample of an output voltage from the regulated resonant converter which is developed between lines 56 and 57 across the capacitor 34 which forms a part of the resonant circuit, the sample being fed via a feedback transformer 58 and a bridge rectifier 59 to provide a d.c. signal level on the lines 53 and 54 which is smoothed by a resistor 60 and a capacitor 61 to provide the feedback voltage.

Figure 3:
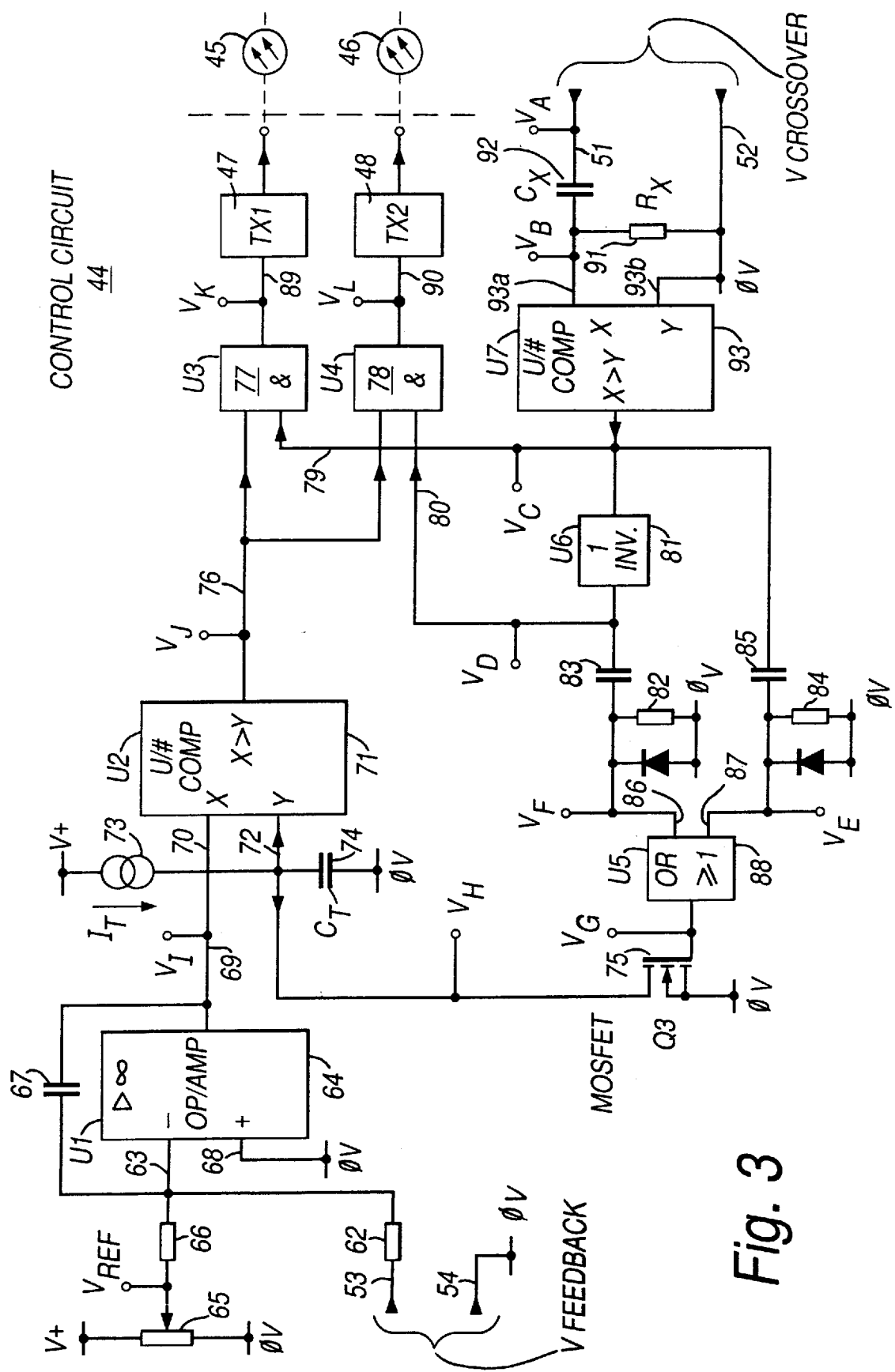
FIG. 3 is a somewhat schematic block/circuit diagram of a control circuit which forms a part of the regulated resonant converter shown in FIG. 2.

Referring now to FIG. 3 wherein the control circuit 44 is shown in greater detail, the feedback voltage developed between lines 53 and 54 is applied via a resistor 62 to one input terminal 63 of an operational amplifier 64, the input terminal 63 being fed also from a potential divider 65 which defines a reference voltage which is applied to the input terminal 63 of the operational amplifier 64 via a resistor 66. The operational amplifier 64 is shunted by a capacitor 67 and another input terminal 68 of the operational amplifier 64 is grounded. The operational amplifier 64 is arranged to feed via a line 69 one input terminal 70 of a comparator 71, the other input terminal 72 of which is fed from a current source 73 which charges a capacitor 74 and which capacitor is discharged by a MOSFET 75. Output signals from the comparator 71 are applied to a line 76 which feeds a pair of AND gates 77 and 78. An input line 79 feeding the AND gate 77 and an input line 80 feeding the AND gate 78 are coupled by an inverter 81, the lines 79 and 80 feeding first and second differentiators comprising a resistor 82 and a capacitor 83 and a resistor 84 and a capacitor 85 respectively. The capacitors 83 and 85 of the first and second differentiators are arranged to feed lines 86 and 87 respectively to provide input signals for an OR gate 88, output signals from which are applied to the MOSFET 75 as shown. Thus output signals from the AND gates 77 and 78 on lines 89 and 90 respectively are used to energise the transmitters 47 and 48 respectively, thereby to produce appropriate optical signals in the optocouplers 45 and 46.

The cross-over voltage on lines 51 and 52 is fed via a differentiator comprising a resistor 91 and a capacitor 92 to a comparator 93. Output signals from the comparator 93 are applied to the line 79 which feeds the AND gate 77 and the capacitor 85 of the second differentiator.

Figure 4:
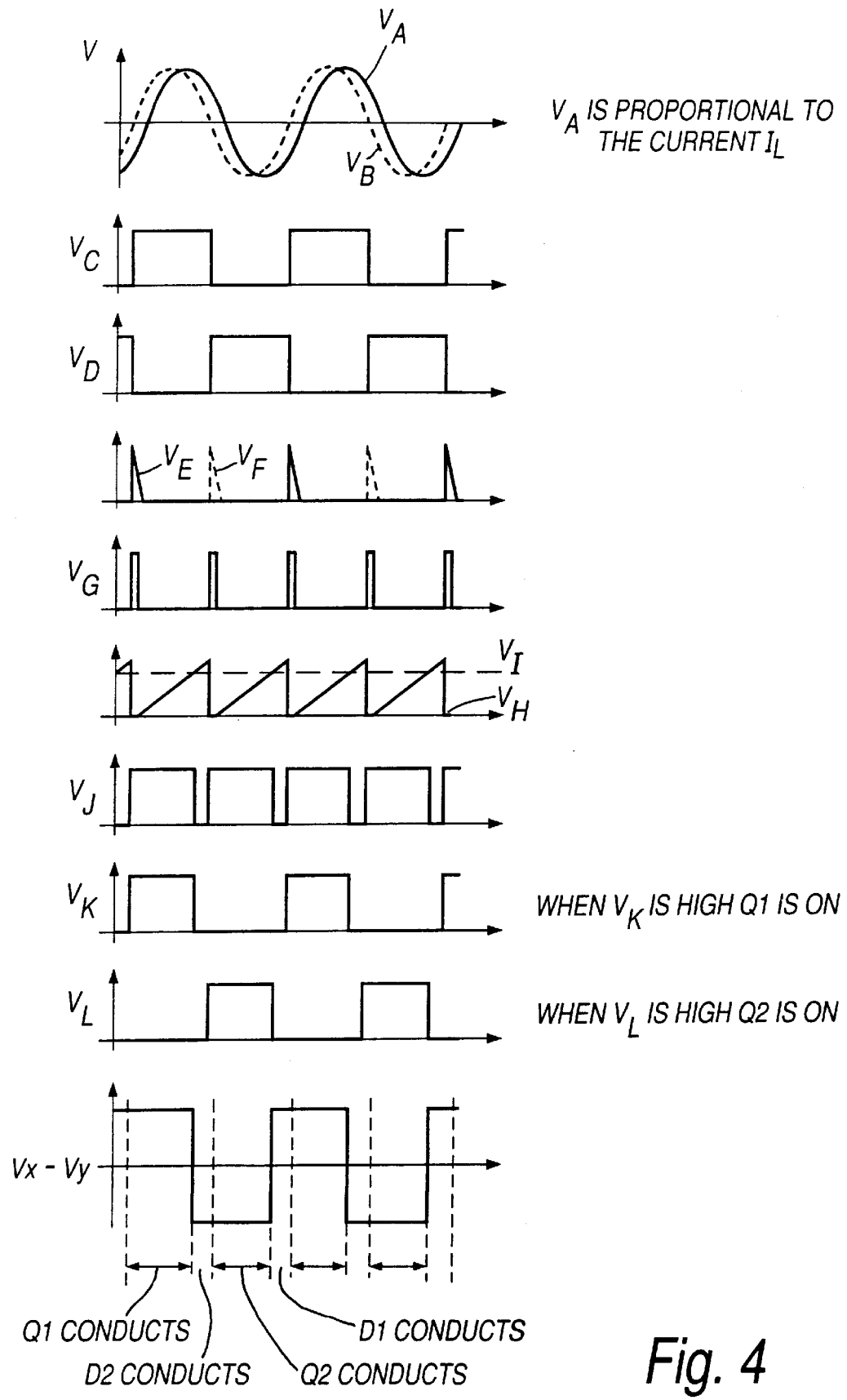
FIG. 4 is a waveform diagram which illustrates various waveforms associated with operation of the regulated resonant converter shown in FIG. 2 and, FIG. 5 is a further waveform diagram showing waveforms associated with operation of a differentiator circuit which forms part of the control circuit shown in FIG. 3.

In operation of the regulated resonant converter, as shown in FIG. 1, and making reference hereinafter to the waveform diagrams of FIGS. 4 and 5 as appropriate, a substantially constant voltage is maintained across the primary windings 9, 10 and 11 of the transformers 12, 13 and 14. This is achieved by operation of the regulated resonant converter as shown in FIG. 2 wherein the control circuit 44 operates to compare the feedback voltage developed between the lines 53 and 54 with the reference voltage derived via the potentiometer 65 in the operational amplifier 64. An error signal VI produced on the line 69 at the output of the operational amplifier 64 is utilised effectively to modify the frequency at which the resonant circuit comprising the capacitor 34 and the inductor 35 operates and hence the voltage generated across the capacitor 34 which defines the output voltage on lines 56 and 57. Thus as the frequency is reduced, the output voltage between the lines 56 and 57 is increased. The control circuit 44 operates to increase the frequency by reducing the 'ON' time of the transistors 31 and 32 and thus which transistor is switched on, and when, is determined in dependence upon a current IL which flows through the resonant circuit as defined by the capacitor 34 and the inductor 35. The coupling transducer 55 serves to monitor this current IL and a corresponding cross-over voltage, developed across a resistor 55a fed from the coupling transducer 55 is applied between lines 51 and 52 to the control circuit 44. This cross-over voltage signal is applied to the differentiator defined by the capacitor 92 and the resistor 91 thereby to generate a voltage which is proportional to the current IL but which leads it in phase.

The output of the comparator 93 is high when the amplitude of the signal fed via the capacitor 92 of the differentiator to an input terminal 93a exceeds the voltage level at its other input terminal 93b. The output of the comparator on the line 79 changes state at a time just before the current IL in the resonant circuit, comprising the capacitor 34 and the inductor 35, reverses. Signals VC and VD on the lines 79 and 80 respectively are used in effect to derive gating signals for the switching transistors 31 and 32. A signal VJ shows the 'ON' time of that one of the switching transistors 31, 32 which is for the time being active. The output of the comparator 71 is high when the error signal VI on its input terminal 70 is greater than a signal VH on its other terminal 72.

It will be apparent that the inclusion of the differentiator comprising the capacitor 92 and the resistor 91 serves to enhance the operation of the control circuit by reducing the 'turn on' switching losses in the switching transistors 31 and 32 and by reducing the r.m.s current in the snubber capacitors 38 and 39. The foregoing advantages can be appreciated from the waveform diagrams of FIG. 5 wherein the switching sequence is considered without the advantage of the differentiator defined by the components 91 and 92.

It will be appreciated that the transistors 'turn on' after the current IL in the resonant circuit has reversed because the circuit relies on sensing the current reversal before it turns one of the two transistors 31, 32 'ON', and additionally the turning 'ON' of a transistor takes a finite time.

Figure 5:
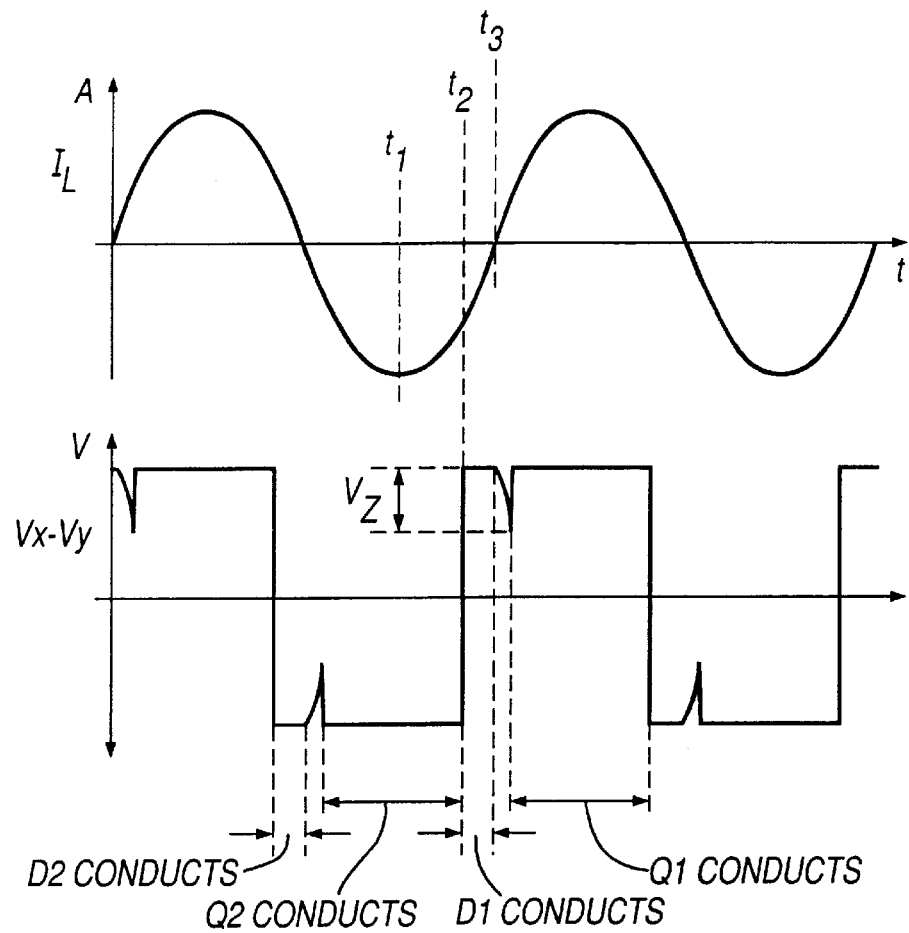
Figure 5:
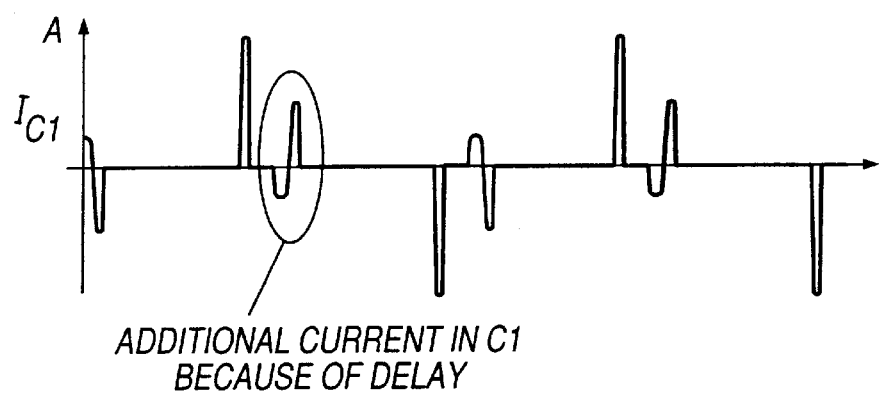
Figure 5:
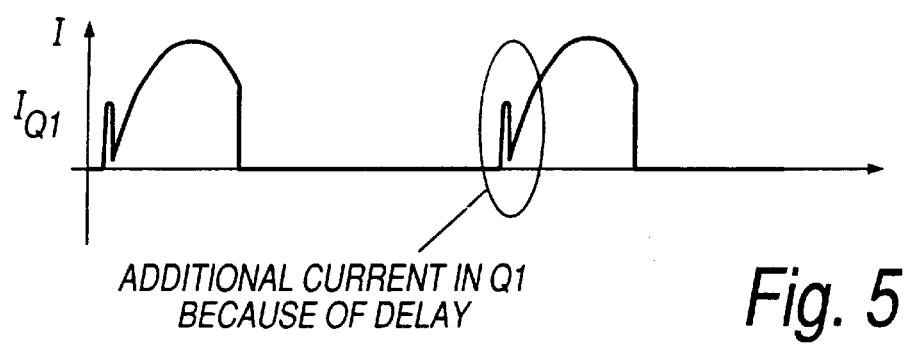

Also shown in FIG. 5, it is assumed that, at a time T1, the transistor 32 is conducting, and that at a time T2, when the transistor 32 turns 'OFF', a voltage VX at a junction between these transistors swings from the negative d.c. rail to the positive d.c. rail until the diode 40 conducts. At a time T3, the current IL in the resonant circuit is zero and the diode 40 ceases to conduct. The energy in the resonant circuit, comprising the capacitor 34 and the inductor 35, forces the current which flows therethrough to reverse and the voltage VX then swings towvards the negative d.c. rail at a rate determined by the time constant of the resonant circuit as defined by the capacitor 34 and the inductor 35 and the values of the capacitors 38 and 39. After a delay, the transistor 31 turns on when the capacitor 38 has a voltage of VZ developed across it. This situation can be avoided by ensuring that the transistor is turned 'ON' at the point of current reversal. The values of the differentiator, as defined by the capacitor 92 and the resistor 91, are chosen to make up for the delay through the control circuit and delays occasioned in the gate drives of the transistors 31 and 32.

Various modifications may be made to the arrangements herein before described without departing from the scope of this invention and, for example, it will be readily appreciated that any suitable regulated resonant converter may be used which is adapted and arranged to be controlled as herein before described.

I claim:

1. A parallel loaded series resonant converter comprising:

a series resonant circuit through which current is switched alternately in opposite directions by a pair of switching transistors, a rectifier via which the switching transistors are fed with d.c. current from an a.c. mains supply input, a control circuit generating signals for controlling operation of the switching transistors in dependence upon a fed-back sample of a convertor output developed in the resonant circuit in accordance with the amplitude of which regulation is effected, and an inductor which forms a part of the resonant circuit producing a cross-over voltage, associated with current reversal in the inductor, which is fed to the control circuit via a differentiator whereby switch operation is effectively enhanced.

2. A parallel loaded series resonant converter as claimed in claim 1, wherein the converter output is a voltage developed in the resonant circuit.

3. A parallel loaded series resonant converter as claimed in claim 1, wherein the switching transistors are coupled to the control circuit via optocouplers through which signals are transmitted from the control circuit to effect operation of the switching transistors.

4. A parallel loaded series resonant converter as claimed in claim 1, wherein the cross-over voltage is generated in a coupling transducer which is responsive to current in the resonant circuit and which is coupled to the control circuit via the differentiator.

5. A parallel loaded series resonant converter as claimed in claim 1, wherein the fed-back sample is a feedback voltage which is sensed across a capacitor which forms a part of the resonant circuit and which is fed via an isolating transformer and a rectifier to the control circuit.

6. A parallel loaded series resonant converter as claimed in claim 5, wherein the feedback voltage is applied to an operational amplifier in the control circuit, together with a reference voltage, the amplitude of which is arranged to be controllable for the purpose of controlling the converter output voltage correspondingly, the operational amplifier being arranged to feed logic circuit means responsive also to the differentiated cross-over voltage, in accordance with the operation of which logic circuit means, switching signals for the switching transistors are generated.

7. An MRI system comprising a parallel loaded series resonant converter as claimed in claim 1 which forms a part of a power supply for gradient coils of the said system.

8. A power supply for an MRI system as claimed in claim 7, comprising three similar transformers, primary windings of which are fed in parallel from the regulated resonant converter, each transformer having a pair of secondary windings so that three pairs of secondary windings are provided, one for each of the three gradient coils of the said system, each pair being arranged to feed a gradient coil with which it is operatively associated, via rectifier and amplifier means.

* * * * *